(12) United States Patent
Ishikawa et al.

(10) Patent No.: US 8,300,932 B2
(45) Date of Patent: Oct. 30, 2012

(54) IMAGE PROCESSOR, INTEGRATED CIRCUIT DEVICE, AND ELECTRONIC APPARATUS

(75) Inventors: Masaki Ishikawa, Kunitachi (JP);
Takekuni Yamamoto, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 626 days.

(21) Appl. No.: 12/482,788

(22) Filed: Jun. 11, 2009

(65) Prior Publication Data
US 2009/0310860 A1    Dec. 17, 2009

(30) Foreign Application Priority Data

Jun. 13, 2008  (JP) ................. 2008-155102
Apr. 24, 2009  (JP) ................. 2009-106232

(51) Int. Cl.
*G06K 9/00* (2006.01)
(52) U.S. Cl. ......... 382/167; 382/162; 382/168; 382/190
(58) Field of Classification Search ............... 382/162, 382/167, 168, 190, 274; 345/589, 594, 204; 348/222.1, E9.01; 355/38; 358/1.9, 517, 358/518, 3.01
See application file for complete search history.

(56) References Cited

U.S. PATENT DOCUMENTS

| | | | |
|---|---|---|---|
| 7,986,833 B2 * | 7/2011 | Shen et al. | ............. 382/167 |
| 2006/0001928 A1 | 1/2006 | Hayaishi | |
| 2007/0195346 A1 | 8/2007 | Fuji | |

FOREIGN PATENT DOCUMENTS

| | | |
|---|---|---|
| JP | A-2003-224860 | 8/2003 |
| JP | A-2003-274210 | 9/2003 |
| JP | A-2006-013836 | 1/2006 |
| JP | A-2007-42033 | 2/2007 |
| JP | A-2007-228255 | 9/2007 |

* cited by examiner

*Primary Examiner* — Anh Hong Do
(74) *Attorney, Agent, or Firm* — Oliff & Berridge, PLC

(57) ABSTRACT

An image processor includes a hue region judging section judging which one of a plurality of hue regions corresponds to a hue and a converting section obtaining a correction value by using the hue to correct the hue based on the correction value. The converting section obtains a first difference value by using a difference between the hue and a first reference value, obtains a second difference value by using a difference between a second reference value and the first difference value, and obtains the correction value by using the second difference value. The hue is corrected based on the correction value.

16 Claims, 9 Drawing Sheets

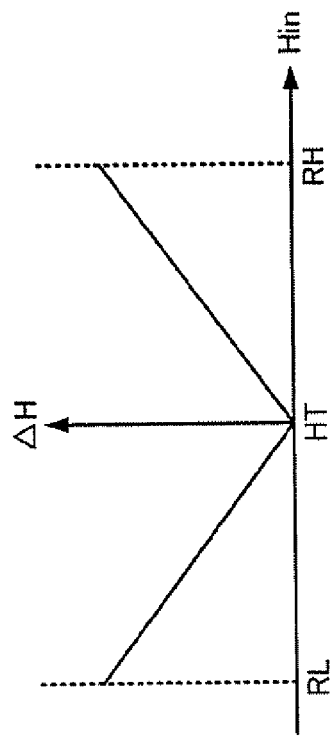
FIG. 3A  $A = HOL = HOH$
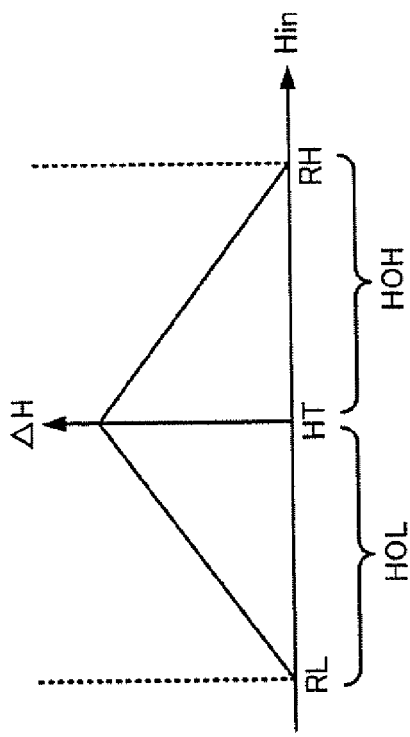
FIG. 3B  $A = 0$
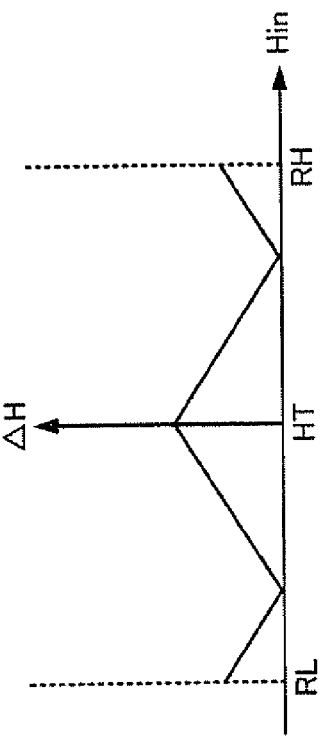
FIG. 3C  $A > HOL,$
$A > HOH$
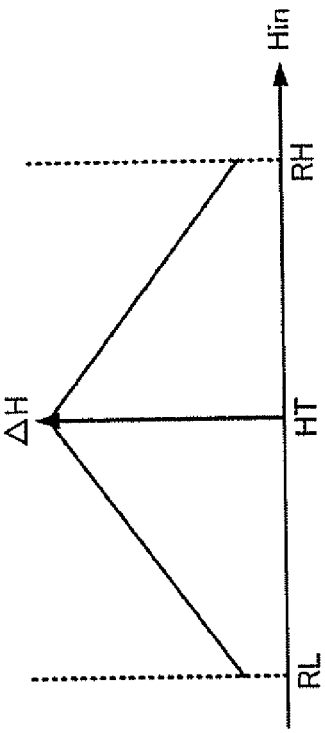
FIG. 3D  $0 < A < HOL,$
$0 < A < HOH$

IMAGE PROCESSOR, INTEGRATED CIRCUIT DEVICE, AND ELECTRONIC APPARATUS

The entire disclosure of Japanese Patent Application No. 2008-155102, filed Jun. 13, 2008 and Japanese Patent Application No. 2009-106232, filed Apr. 24, 2009 are expressly incorporated by reference herein.

BACKGROUND

1. Technical Field

An aspect of the present invention relates to an image processor, an integrated circuit device, and an electronic apparatus.

2. Related Art

Image processing uses various color space models, such as an HSV (Hue, Saturation, and Value) color space. For example, human perception of colors is particularly sensitive to memory colors such as the skin color or the sky blue. Thus, correcting the memory colors in the HSV color space allows images to be displayed with colors natural to human eyes.

On the other hand, image processing in the HSV color space causes a drastic color difference at a boundary between a corrected color and a non-corrected color, thereby making a boundary portion distinct. Due to the problem, conventionally, a correction value has been approximated more closely to zero as closer to a boundary of a hue region to be corrected, so as to prevent colors from being different drastically (e.g. JP-A-2007-42033).

In the conventional correction as above, however, correction flexibility is restricted, since the correction value becomes zero at the boundary of the hue region to be corrected.

SUMMARY

An advantage of the present invention is to provide an image processor that allows highly flexible correction of HSV image data. Other advantages of the invention are to provide an integrated circuit device including the image processor and an electronic apparatus including the integrated circuit device.

An image processor according to a first aspect of the invention includes a hue region judging section judging which one of a plurality of hue regions corresponds to a hue and a converting section obtaining a correction value by using the hue to correct the hue based on the correction value, the converting section obtaining a first difference value by using a difference between the hue and a first reference value, obtaining a second difference value by using a difference between a second reference value and the first difference value, and obtaining the correction value by using the second difference value to correct the hue based on the correction value.

The image processor of the aspect performs hue correction suitable for each of the hue regions, thereby allowing hue correction of an intended hue region. In addition, the correction value is calculated by using the first and the second reference values, thereby allowing the correction value to be set to an arbitrary value at a boundary between the hue regions. Furthermore, when the hue regions are provided adjacent to each other, the correction value at the boundary can be equalized between the adjacent hue regions. This can prevent colors from being drastically different at the hue region boundary, without setting the correction value to zero at the boundary. Thus, the image processor of the aspect enables hue correction to be performed with high flexibility, without causing any drastic color difference.

An image processor according to a second aspect of the invention includes a hue region judging section judging which one of a plurality of hue regions corresponds to a hue and a converting section obtaining a correction value by using the hue to correct a saturation based on the correction value, the converting section obtaining a first difference value by using a difference between the hue and a first reference value, obtaining a second difference value by using a difference between a second reference value and the first difference value, and obtaining the correction value by using the second difference value to correct the saturation based on the correction value.

The image processor of the second aspect performs saturation correction suitable for each of the hue regions, thereby allowing saturation correction of an intended hue region. In addition, similarly to the hue correction by the image processor of the first aspect, the correction value can be set to an arbitrary value at the boundary between the hue regions. Thereby, the correction value at the boundary can be equalized between the adjacent hue regions, so that a high flexible correction can be performed without causing any drastic color difference.

Preferably, the converting section obtains, as the first difference value, an absolute value of the difference between the hue and the first reference value and obtains the second difference value by using a difference between the second reference value and the first difference value to obtain the correction value by using the second difference value.

In the image processor, the correction value is obtained by using the absolute value of the difference between the hue and the first reference value. The obtained correction value is represented by a line bent at the first reference value. Consequently, the image processor can obtain the correction value represented by a combination of a plurality of lines.

In addition, preferably, the converting section obtains the correction value by using, as the second difference value, an absolute value of the difference between the second reference value and the first difference value.

In this manner, by adjusting the second reference value, the image processor can obtain a correction value represented by a line having a plurality of bends in the hue region. Thus, calculation of the correction value by using a simple primary expression allows complicated correction.

Additionally, in the image processor, preferably, the converting section multiplies the second difference value by a correction coefficient to obtain the correction value.

In the image processor, adjusting the correction coefficient allows adjustment of a magnitude and a sign (plus or minus) of the correction value. This can lead to adjustment of a correction direction and an inclination of a characteristic line of the correction value. For example, the inclination of the characteristic line of the correction value can be changed at a boundary between adjacent hue regions. Thus, the image processor can perform more flexible correction.

Preferably, the image processor further includes a coefficient register setting the first and the second reference values and the correction coefficient, and the converting section reads out the reference values and the correction coefficient from the coefficient register based on a judgment result from the hue region judging section.

In the image processor, the first and the second reference values and the correction coefficient can be set independently for each of the hue regions. Accordingly, based on the judgment result of the hue region judging section, there can be obtained a correction value corresponding to each hue region, thereby enabling each of the hue regions to be corrected by using an independent correction value.

Additionally, in the image processor, preferably, the converting section obtains a multiplication coefficient by using a saturation and multiplies the second difference value by the multiplication coefficient to obtain the correction value.

The image processor can obtain a saturation-dependent correction value. Thereby, correction can be performed in accordance with both a hue and a saturation in the hue regions.

In the image processor, preferably, the converting section multiplies the saturation by a saturation coefficient to obtain the multiplication coefficient and multiplies the second difference value by the multiplication coefficient to obtain the correction value.

In the image processor, adjusting the saturation coefficient allows adjustment of the magnitude and the sign (plus or minus) of the correction value. This can lead to adjustment of a correction direction and a change rate of the correction value In addition, in the image processor, preferably, the converting section adds a result of the multiplication between the saturation and the saturation coefficient to a correction coefficient to obtain the multiplication coefficient and multiplies the second difference value by the multiplication coefficient to obtain the correction value.

The image processor can obtain a correction value dependent on a primary expression of the saturation. This can change the plus or minus sign of the correction value in accordance with the saturation as well as a plus or minus unidirectional correction value.

Preferably, the image processor further includes a coefficient register setting the first and the second reference values, the correction coefficient and the saturation coefficient, and the converting section reads out the reference values and the coefficients from the coefficient register based on a judgment result from the hue region judging section.

In the image processor, the first and the second reference values, the correction coefficient and the saturation coefficient can be set independently for each of the hue regions. Accordingly, based on the judgment result from the hue region judging section, a correction value corresponding to each hue region can be obtained, so that each of the hue regions can be corrected by using an independent correction value.

Preferably, in the image processor, the converting section includes a saturation converting section converting the saturation to output a converted saturation and obtains a multiplication coefficient by using the converted saturation to multiply the second difference value by the multiplication coefficient so as to obtain the correction value.

The image processor can obtain a converted saturation-dependent correction value, thereby achieving correction arbitrarily dependent on a saturation. For example, correction intensity can be increased in a part of a saturation range. Consequently, in the image processor, more flexible correction can be performed.

Preferably, in the image processor, the saturation converting section converts the saturation based on a look-up table to output the converted saturation.

In the image processor, using the look-up table allows conversion of a saturation, thereby enabling the saturation to be arbitrarily converted to a converted saturation.

Preferably, in the image processor, the converting section multiplies the converted saturation by a saturation coefficient to obtain the multiplication coefficient and multiplies the second difference value by the multiplication coefficient to obtain the correction value.

In the image processor, adjusting the saturation coefficient allows adjustment of the magnitude and the plus or minus sign of the correction value, thereby adjusting a correction direction and the change rate of the correction value.

Preferably, in the image processor, the converting section adds a result of the multiplication between the converted saturation and the saturation coefficient to a correction coefficient to obtain the multiplication coefficient and multiplies the second difference value by the multiplication coefficient to obtain the correction value.

This allows a converted saturation-dependent correction to be added to a hue-dependent correction.

An integrated circuit device according to a third aspect of the invention includes the image processor of the first aspect.

An electronic apparatus according to a fourth aspect of the invention includes the integrated circuit device of the third aspect.

BRIEF DESCRIPTION OF THE DRAWINGS

The invention will be described with reference to the accompanying drawings, wherein like numbers reference like elements.

FIGS. 3A to 3D are charts showing examples of a characteristic line of a correction value.

DESCRIPTION OF EXEMPLARY EMBODIMENTS

Embodiments of the invention will be described in detail. The embodiments described below should not unduly restrict to the scope of the invention as claimed, and not all of structures and elements described in the embodiments below are essential to solve the problems by the invention.

1. Hue Correction and Saturation Correction 1-1. Structural Example of Image Processor An image processor according to an embodiment of the invention performs image correction of HSV image data (image data in an HSV format) formed by color components: hue (H), saturation (S), and value (V). In an image correction technique by the image processor of the embodiment, a highly flexible correction value can be obtained by a primary expression using two reference values (a correction reference target value HT and a correction reference difference value A). The image processor of the embodiment will be described in detail below.

Figure 1:
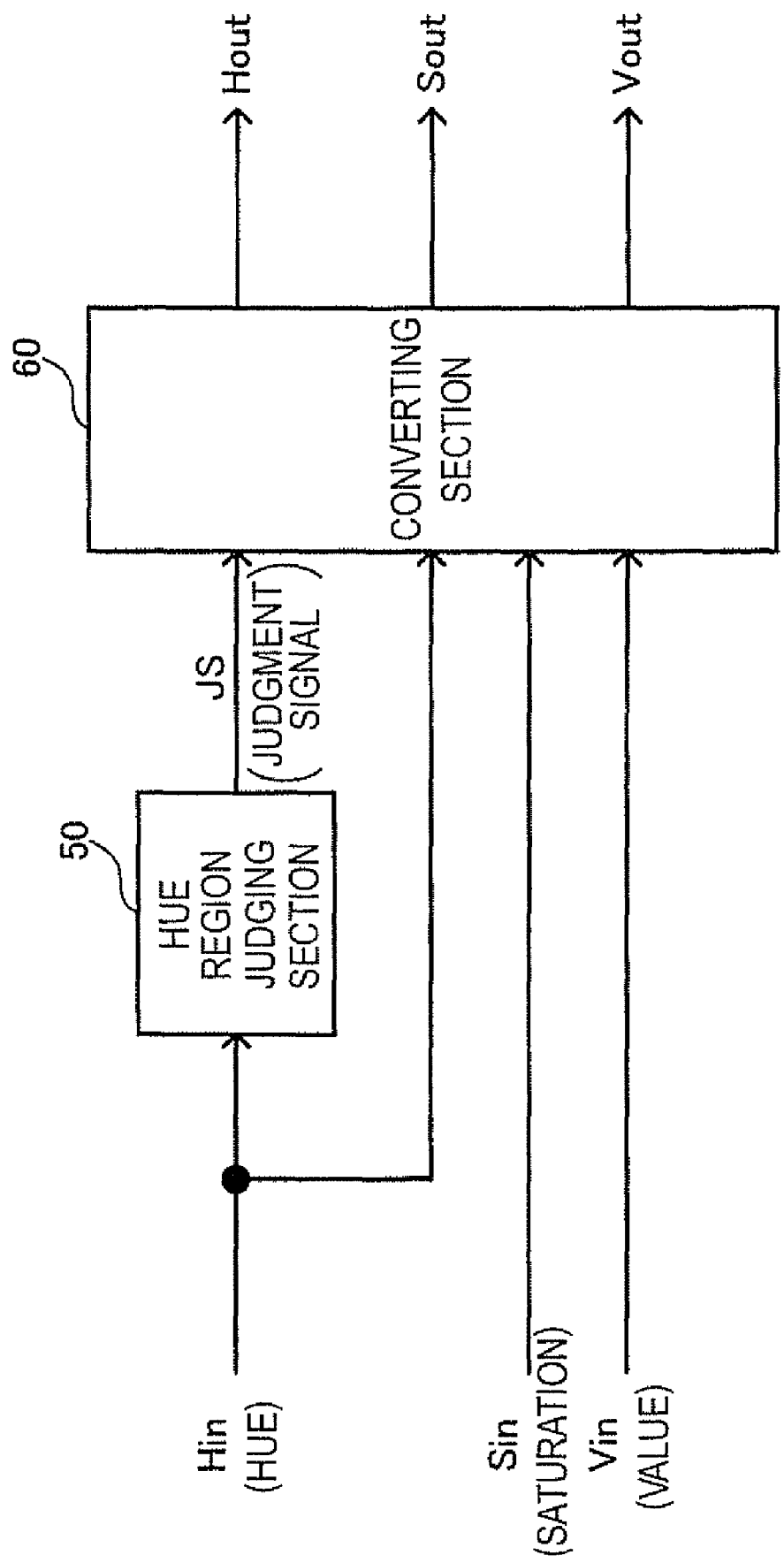
FIG. 1 is a diagram of a structural example of an image processor according to an embodiment of the invention.

FIG. 1 is a diagram showing a structural example of the image processor of the embodiment. The image processor includes a hue region judging section 50 and a converting section 60 (a color correcting section). For example, HSV image data is input to the image processor. The input HSV image data includes a hue Hin, a saturation Sin, and a value Vin. The hue region judging section 50 judges whether the hue Hin corresponds to a predetermined hue region (a hue range) or not to output a judgment signal JS. The converting section 60 receives the judgment signal JS to obtain a correction value ΔH and then corrects the hue Hin by using the correction value ΔH to output a post-correction hue Hout.

Figure 2A:
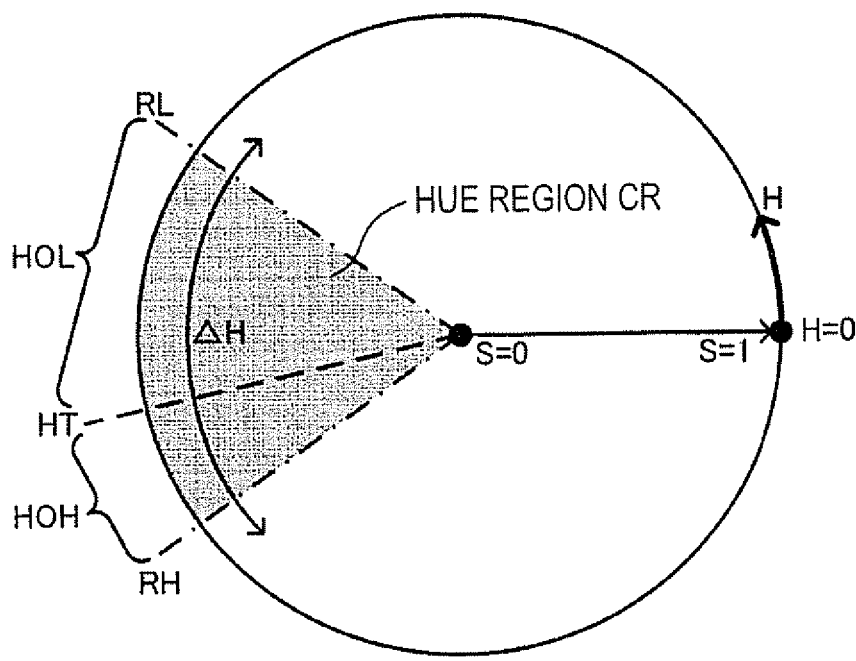
FIGS. 2A and 2B are illustrations of image correction.

FIG. 2A is a diagram illustrating the image correction technique by the image processor of the embodiment. A circle shown in FIG. 2A represents a color space regarding hue and saturation in an HSV color space. Specifically, the hue is shown in a circumferential direction of the circle and the saturation is shown in a radial direction of the circle.

As in FIG. 2A, for example, a range from a hue RL to a hue RH is set as a hue region CR. In this case, the hue region judging section 50 judges whether the hue Hin lies in the hue region CR to output a corresponding judgment signal JS. Specifically, if the hue Hin is in the hue region CR, the hue region judging section 50 outputs a judgment signal JS corresponding to the hue region CR, and if not, the section 50 outputs a judgment signal JS corresponding to a region other than the hue region CR. The converting section 60 calculates a correction value ΔH corresponding to the hue region CR if the judgment signal JS corresponds to the hue region CR. Specifically, the correction value ΔH is obtained as a function of the hue Hin or the saturation Sin. Then, the converting section 60 corrects the HSV image data (the Hin, the Sin, and the Vin) to data (Hin+ΔH, Sin, and Vin) to output as output HSV image data (Hout, Sout, and Vout). The correction based on the correction value ΔH corresponds to movement of a point corresponding to the image data (the Hin, the Sin, and the Vin) in the circumferential direction on a circle shown in FIG. 2A.

Figure 2B:
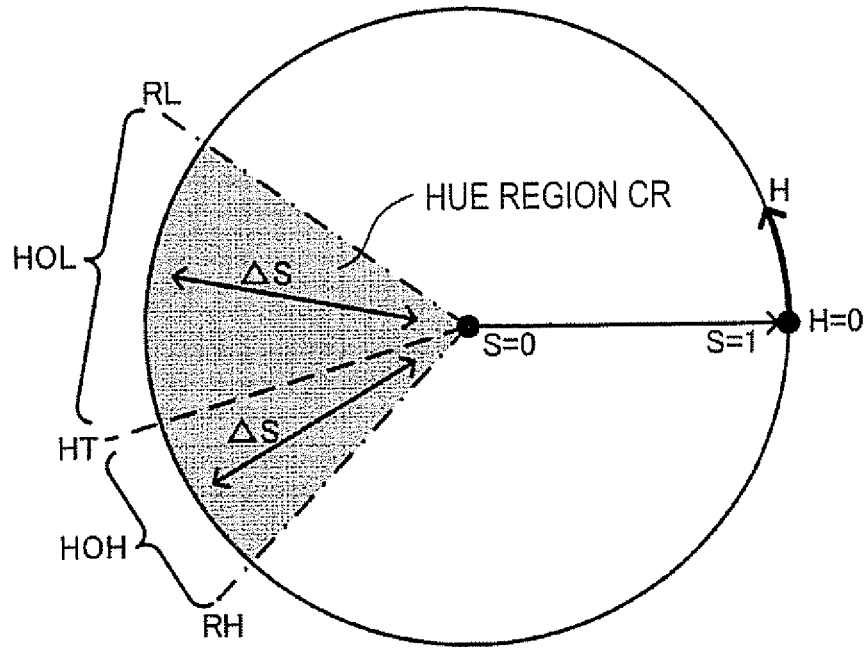

Additionally, the converting section 60 may receive the judgment signal JS to obtain a correction value ΔS so as to correct the Sin. As shown in FIG. 2B, if the judgment signal JS corresponds to the hue region CR, the converting section 60 calculates a correction value ΔS corresponding to the hue region CR. The correction value ΔS is obtained as a function of the hue Hin or the saturation Sin. Then, the converting section 60 corrects the image data (the Hin, the Sin, and the Vin) to image data (Hin, Sin+ΔS, and Vin) to output as output image data (Hout, Sout, and Vout). The correction based on the correction value ΔS corresponds to movement of a point corresponding to the image data (the Hin, the Sin, and the Vin) in a radial direction on a circle shown in FIG. 2B.

1-2. Correction Value 1-2-1. Specific Examples of Calculation Method of Correction Value as Function of Hue Hereinafter, a calculating method for a correction value ΔH will be described using each of specific examples. Since the specific examples can also be applied to calculation of a correction value ΔS, the description below will be mainly focused on the specific examples for calculating the correction value ΔH.

A following expression (1) shows a first specific example of the calculation method of the correction value ΔH. As in the expression (1), the converting section 60 calculates a difference between an input hue Hin and a correction reference target value HT to obtain an absolute value of the difference as a first difference value D1 (a first difference absolute value). Next, the converting section 60 calculates a difference between a correction reference difference value A and the first difference value D1 to obtain an absolute value of the difference as a second difference value D2 (a second difference absolute value). In the first specific example, the converting section 60 uses the second difference value D2 as the correction value ΔH.

Expression 1

$$\Delta H = |A - |Hin - HT||  \quad (1)$$

The correction reference target value HT is a first reference value. In other words, the correction reference target value HT is a reference value in the difference calculation using the hue Hin (the calculation of the difference value D1) and also an arbitrary hue set in the range of the hue region CR. The correction reference difference value A is a second reference value, namely, a reference value in the difference calculation using the difference value D1 (the calculation of the difference value D2), whereby an arbitrary hue is set regardless of the hue region CR. In addition, the hue region CR is set by a low-hue region range HOL and a high-hue region range HOH based on the correction reference target value HT, as shown in FIGS. 2A and 2B. Specifically, the hue region CR is set by the hues RL (HT−HOL) and RH (HT+HOH). The values HT, A, HOL, and HOH are each set by a register value from a coefficient register 300 shown in FIG. 8 described below, for example.

On the other hand, in the HSV color space, correction in a predetermined region causes a drastic color difference at a regional boundary, whereby the color difference appears as a false contour on a display image.

For example, as a comparative example, correction may be performed using a correction value of zero at the regional boundary. In the comparative example, by allowing the correction value to gradually become closer to zero, color change due to correction becomes smaller as closer to the regional boundary as it comes, so that the drastic color change at the regional interface can be prevented.

However in the comparative example, the correction value needs to be zero at the regional interface, which limits a setting range of the correction value.

Meanwhile, in the first specific example described above, the correction value ΔH is obtained using the correction reference difference value A. Accordingly, the correction value ΔH can be set to an arbitrary value at the interface of the hue region CR. In addition, using the absolute value of the difference allows the correction value to be obtained as a complicated correction value ΔH despite the simple primary expression. Furthermore, as will be shown below, a plurality of hue regions may be provided, whereby a characteristic line of the correction value ΔH is smoothly connected at the regional interface and thereby can prevent the drastic color change at the interface. In this manner, the image processor of the present embodiment can perform a highly flexible correction.

The correction value calculation will be described in more detail referring to FIGS. 3A to 3D. The drawings show examples of the correction value ΔH in the hue region CR.

As in FIG. 3A, when the correction reference difference value A, the low-hue region range HOL, and the high-hue region range HOL are set to be equal to one another, the correction value ΔH can be a maximum at a point: Hin=HT and can be zero at the boundaries of the hue region CR (the hues RL and RH).

Next, as shown in FIG. 3B, when the value is equal to zero, the correction value ΔH can be zero at the point: Hin=HT and the correction value ΔH can be a value that is not zero at the boundaries of the hue region CR.

In addition, as in FIG. 3C, when the value A is larger than each of the range HOL and the range HOH, the correction value ΔH can be a maximum at the point: Hin=HT and can be a value that is not zero at the boundaries of the hue region CR.

Furthermore, as in FIG. 3D, when the value A is larger than zero and smaller than each of the range HOL and the range HOH, a plurality of bends can be provided in the characteristic line of the correction value ΔH in the hue region CR.

Thus, adjusting the correction reference difference value A allows an arbitrary correction value ΔH to be obtained at the boundaries of the hue region CR. In addition, while the correction value ΔH is obtained by the primary expression of the hue Hin and thus is represented by a line, the correction value ΔH may be represented by a plurality of lines using absolute values of the difference values D1 and D2.

A following expression (2) shows a second specific example of the method for calculating the correction value ΔH. As shown in the example, the converting section 60 may multiply the difference value D2 by a coefficient C (a correction coefficient) to obtain the correction value ΔH. The coefficient C is a positive or negative value.

Expression 2

$$\Delta H=|A-|Hin-HT||*C \quad (2)$$

In this manner, by the multiplication between the coefficient C and the difference value D2, the correction value ΔH can be set as a positive or negative value, thereby adjusting a magnitude of the correction value ΔH. This allows adjustment of a correction direction and an inclination of change in the correction value ΔH relative to the hue Hin. Consequently, the second specific example can perform a wider adjustment of the correction value ΔH.

A following expression (3) shows a third specific example of the method for calculating the correction value ΔH. In the third example, the converting section 60 may add an offset D to a result of the multiplication between the difference value D2 and the coefficient C to obtain the correction value ΔH. The offset D is a positive or negative value.

Expression 3

$$\Delta H=|A-|Hin-HT||*C+D \quad (3)$$

Thereby, an entire part of the hue region CR can be evenly corrected. Specifically, by adjusting the offset D, color correction can be performed entirely on the hue region CR in a same direction by a same amount of correction.

Furthermore, following expressions (4) and (5) show a fourth specific example of the calculation method of the correction value ΔH. As in the example, the converting section 60 may obtain a correction value ΔHL or ΔHH as the correction value ΔH. That is, for example, the converting section 60 can obtain the correction value ΔHL as the correction value ΔH if the hue Hin corresponds to the low-hue region (the range from the hue RL to the correction reference target value HT) in the hue region CR. If the hue Hin corresponds to the high-hue region (the range from the correction reference target value HT to the hue RH) in the hue region CR, the converting section 60 can obtain the correction value ΔHH as the correction value ΔH. In the expressions (4) and (5), correction reference difference values AL and AH are independent values. Similarly, coefficients CL and CH (correction coefficients) and offsets DL and DH, respectively, are also independent values.

Expression 4

$$\Delta HL=|AL-|Hin-HT||*CL+DL \quad (4)$$

Expression 5

$$\Delta HH=|AH-|Hin-HT||*CH+DH \quad (5)$$

The hue region judging section 50 judges whether the input hue Hin is a value in the low-hue region or the high-hue region to output a corresponding judgment signal JS.

In the fourth specific example, correction can be performed using the correction values ΔHL and ΔHH. This allows the correction value ΔH to be adjusted independently for each of the low-hue region and the high-hue region. Thus, the fourth specific example can achieve a highly flexible correction.

The embodiment may provide a plurality of hue regions. Specifically, in the embodiment, there can be set hue regions 1 to k (1st to k-th hue regions; k is a natural number). Then, the converting section 60 can obtain correction values ΔH1 to ΔHk corresponding to the hue regions 1 to k.

More specifically, following expressions (6) and (7) show a fifth specific example of the calculation method of the correction value ΔH. As shown in the expression (6), the converting section 60 obtains a correction value ΔHLn as the correction value ΔH if the hue Hin corresponds to a low-hue region n (an n-th low-hue region) in the hue region n (n is a natural number equal to or smaller than k). In addition, as in the expression (7), if the hue Hin corresponds to a high-hue region n (an n-th high-hue region) in the hue region n, the converging section 60 obtains a correction value ΔHHn as the correction value ΔH. In the expressions (6) and (7), correction reference difference values AL1 to ALk and ΔH1 to ΔHk, respectively, are independent values. Similarly, correction reference target values HT1 to HTk, coefficients CL1 to CLk, and offsets DL1 to DLk and DH1 to DHk, respectively, are independent values.

Expression 6

$$\Delta HLn=|ALn-|Hin-HTn||*CLn+DLn \quad (6)$$

Expression 7

$$\Delta HHn=|AHn-|Hin-HTn||*CHn+DHn \quad (7)$$

The hue region judging section 50 judges whether the input hue Hin is a value in the low-hue region n or in the high-hue region n to output a corresponding judgment signal JS.

In the above comparative example, in order to prevent an occurrence of a false contour, the correction value was set to zero at the boundaries of the hue region. Thus, there is a limitation on the adjustment range of correction.

Figure 4:
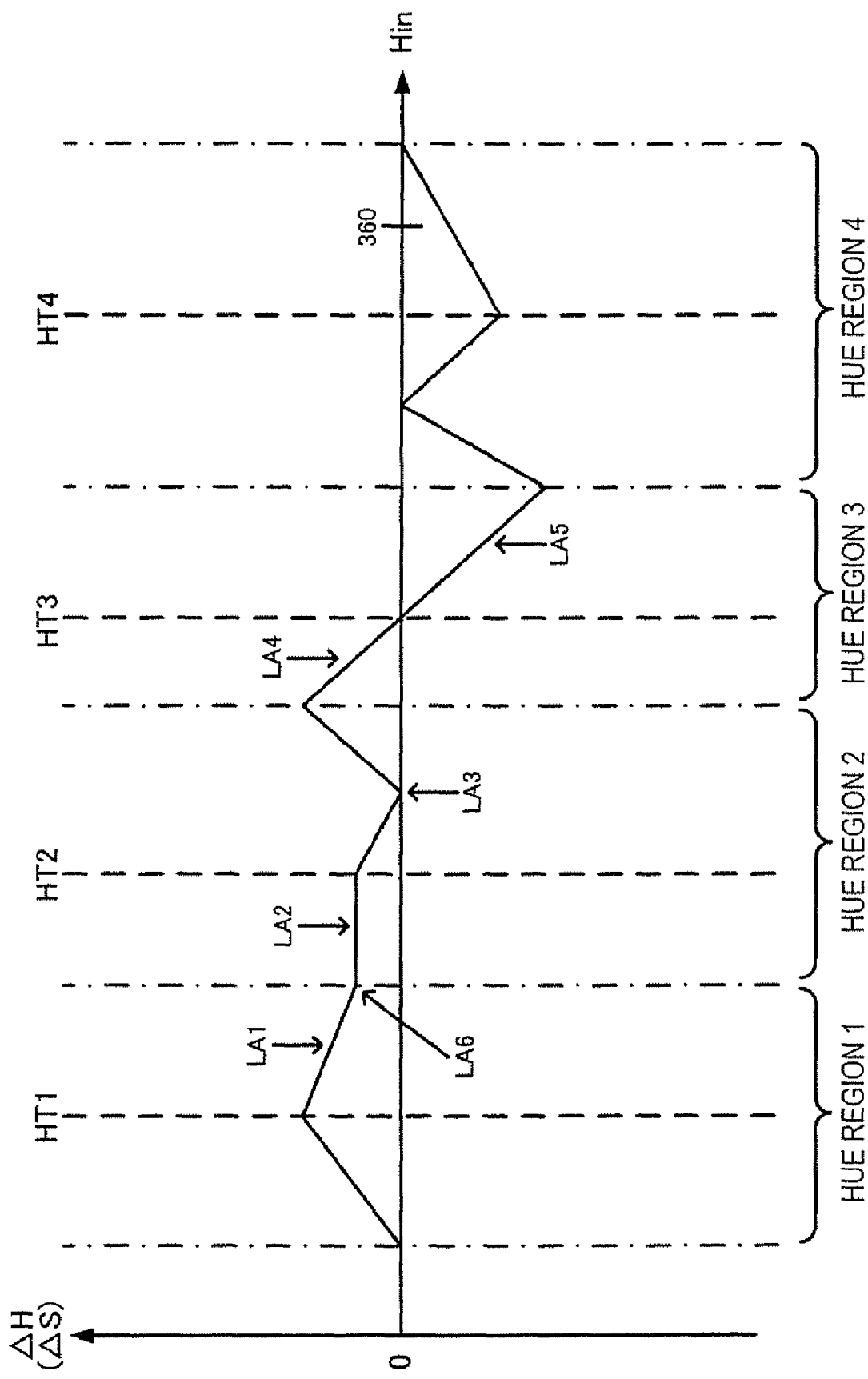
FIG. 4 is a chart showing examples of a characteristic line of a correction value in a plurality of hue regions.

On this point, in the fifth specific example, the characteristic lines of the correction value ΔH can be connected at an arbitrary value at the boundary between the hue regions. In addition, the correction value ΔH can be adjusted independently for each of the plurality of hue regions. This will be described with reference to FIG. 4. FIG. 4 shows examples of the correction value ΔH obtained when hue regions 1 to 4 (k=4) are provided adjacent to each other as the hue regions.

For example, as indicated by LA1 in FIG. 4, by adjusting the correction reference difference value A or the like, the correction value ΔH can be set to a value other than zero at a boundary of the hue region 1. In addition, as indicated by LA2, by adjusting the offset D or the like, the correction value ΔH can be set to a predetermined value. Furthermore, as indicated by LA3, adjusting the correction reference difference value A or the like allows the correction value ΔH to be set to zero also in a region other than a boundary of the hue region 2. Still furthermore, as indicated by LA4 and LA5, respectively, adjusting the coefficient C allows the correction value ΔH to be set to a positive value and a negative value, respectively.

In this manner, the correction value ΔH can be adjusted independently for each of the hue regions. Thus, highly flexible correction can be performed only by using a simple combination of lines.

Then, as indicated by LA6 in FIG. 4, at the boundary between the adjacent hue regions 1 and 2, the correction values ΔH indicated by LA1 and LA2 can be adjusted so as to be equalized. Thereby, an inclination of the line can be changed at a point along the line.

As described above, in the embodiment, the characteristic lines of the correction value can be connected by an arbitrary value at the boundary between the hue regions, thereby preventing drastic color change at the boundary between the hue regions. This can prevent the occurrence of a false contour due to the drastic color change and can achieve the highly flexible correction. Furthermore, the correction can be performed using the simple primary expressions, so that the highly flexible correction can be provided without increasing a circuit size, as compared to use of a quadratic expression or the like.

Although FIG. 4 shows the hue regions adjacent to one another, the embodiment can also be applied to a plurality of hue regions that are spaced apart from each other.

1-2-2. Specific Example of Calculation Method of Correction Value as Function of Saturation In the embodiment the correction value ΔH can be obtained using an input saturation Sin. Thereby, image correction can be performed that is dependent not only on the hue Hin but on the saturation Sin, so that image data quality can be improved more than in the first to the fifth specific examples.

A following expression (8) shows a sixth specific example of the method for calculating the correction value ΔH. As indicated by the expression (8), the converting section 60 may multiply the saturation Sin by a coefficient B (a saturation coefficient) to obtain a multiplication coefficient MC (=B*Sin). Then, the converting section 60 can obtain the correction value ΔH by multiplying the difference value D2 by the multiplication coefficient MC. The coefficient B is a positive or negative value.

Expression 8

$$\Delta H = |A - |Hin - HT||*B*Sin \quad (8)|$$

Thereby, correction dependent on the saturation Sin can be achieved. Additionally, a sign and a magnitude of the correction value can be adjusted by the coefficient B.

A following expression (9) shows a seventh specific example of the method for calculating the correction value ΔH. As in the example, the converting section 60 may add a coefficient C (a correction coefficient) to a result of the multiplication between the saturation Sin and the coefficient B to obtain a multiplication coefficient MC (=B*Sin+C).

Expression 9

$$\Delta H = |A - |Hin - HT||*(B*Sin + C) \quad (9)|$$

In the seventh specific example, a saturation Sin-dependent correction can be added to a correction independent of the saturation Sin described in the first to the fifth examples. In other words, adjusting the coefficients B and C allows adjustment of the correction value ΔH to be adjusted by an arbitrary primary expression of the saturation Sin. This can intuitively make a combination of a saturation-dependent correction value and a correction value dependent only on the hue to determine the correction value ΔH.

In addition, following expressions (10) and (11) show an eighth specific example of the method for calculating the correction value ΔH. As in those examples, the converting section 60 may use a converted saturation LUT[Sin] obtained by converting the saturation Sin to obtain the correction value ΔH. In this case, the saturation Sin is converted in accordance with an arbitrary conversion (a conversion expression).

Expression 10

$$\Delta H = |A - |Hin - HT||*B*LUT[Sin] \quad (10)|$$

Expression 11

$$\Delta H = |A - |Hin - HT||*(B*LUT[Sin] + C) \quad (11)|$$

Figure 5:
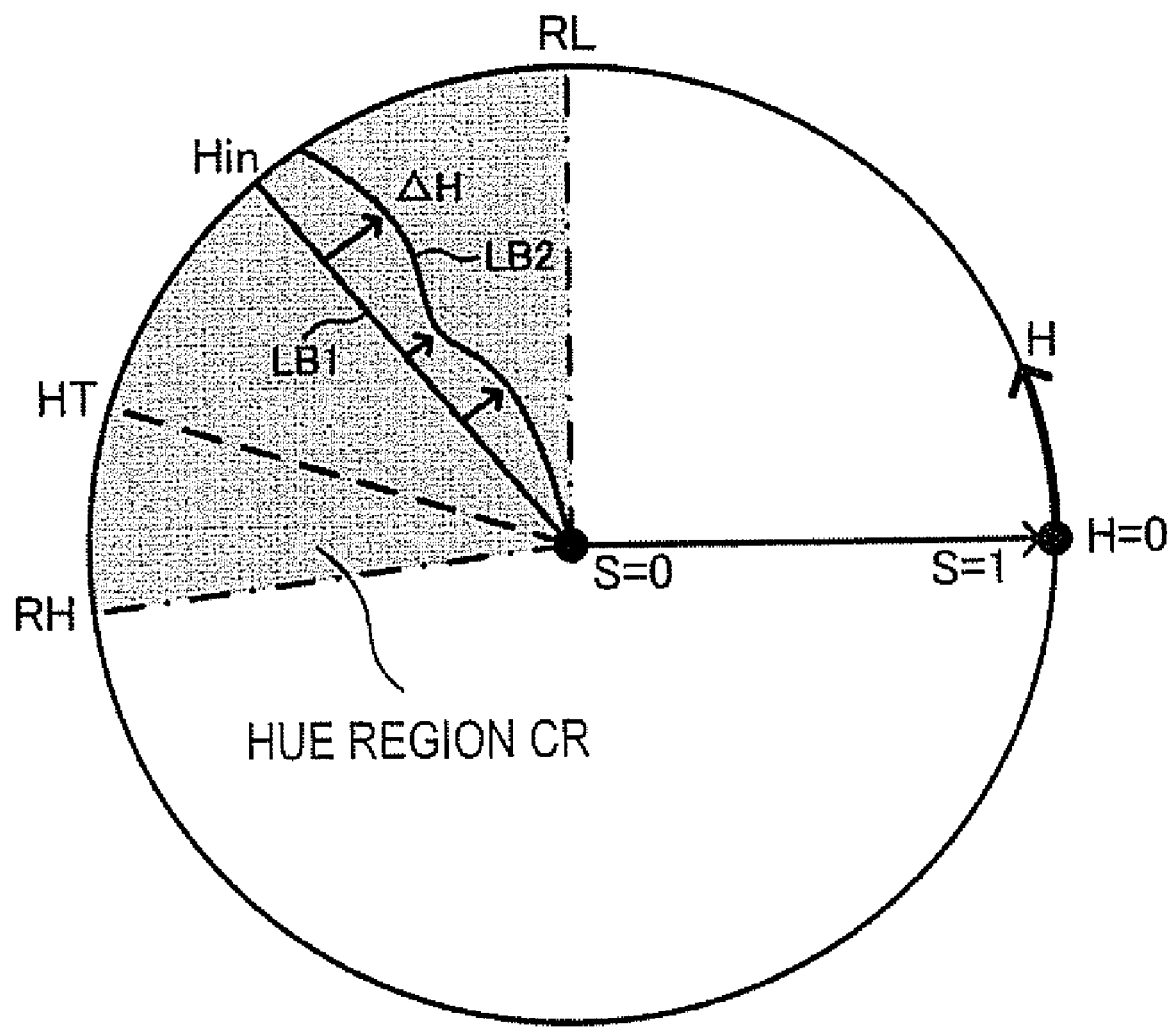
FIG. 5 is a chart showing an example of correction using a converted saturation.

FIG. 5 is a schematic diagram showing an example of correction using the converted saturation LUT[Sin]. Specifically, in this example, using the correction value ΔH, points Hin and Sin, respectively, on a line LB1 are corrected to points Hin+ΔH and Sin, respectively, on a line LB2. As indicated by the LB2, the converted saturation LUT[Sin] is used to obtain the correction value ΔH, whereby the obtained correction value ΔH can have an arbitrary dependence on the saturation Sin. Therefore, the image processor of the embodiment can perform a desired correction in accordance with the saturation Sin.

For example, conversion based on an arbitrary conversion law can be achieved using a look-up table 240, which will be described with reference to FIG. 8.

A following expression 12 shows a ninth specific example of the method for calculating the correction value ΔH. As shown in the ninth example, the converting section 60 may add the offset D to obtain the correction value ΔH, like the third specific example. In addition, as in a tenth specific example of the calculation method of the correction value ΔH in following expressions (13) and (14), the converting section 60 may obtain a correction value corresponding to each of a low-hue region and a high-hue region in a hue region, as in the third specific example, or may obtain a correction value corresponding to each of a plurality of hue regions, like the fourth specific example.

Expression 12

$$\Delta H = |A - |Hin - HT||*(B*LUT[Sin] + C) + D \quad (12)|$$

Expression 13

$$\Delta HLn = |ALn - |Hin - HTn||*(BLn*LUT[Sin] + CLn) + DLn \quad (13)$$

Expression 14

$$\Delta HHn = |AHn - |Hin - HTn||*(BHn*LUT[Sin] + CHn) + DHn \quad (14)|$$

Thereby, a saturation Sin-dependent correction can be performed in the plurality of hue regions. Additionally, by adjusting the offset D, the saturation Sin-dependent correction can be added to the correction evenly performed in the entire hue region.

For example, as in a following expression (15), the first to the tenth specific examples of the calculation method may also be applied to a calculation of the correction value ΔS. Alternatively, in the embodiment, a correction value ΔV may be calculated to correct the value Vin. Similarly in this case, for example, as in a following expression (16), the first to the tenth specific examples of the calculation method may be applied to the calculation of the correction value ΔV.

Expression 15

$$\Delta S = |A - |Hin - HT||*(B*LUT[Sin] + C) + D \quad (15)$$

Expression 16

$$\Delta V = |A - |Hin - HT|| * (B * LUT[Sin] + C) + D \quad (16)$$

2. Cascade Connection

Figure 6:
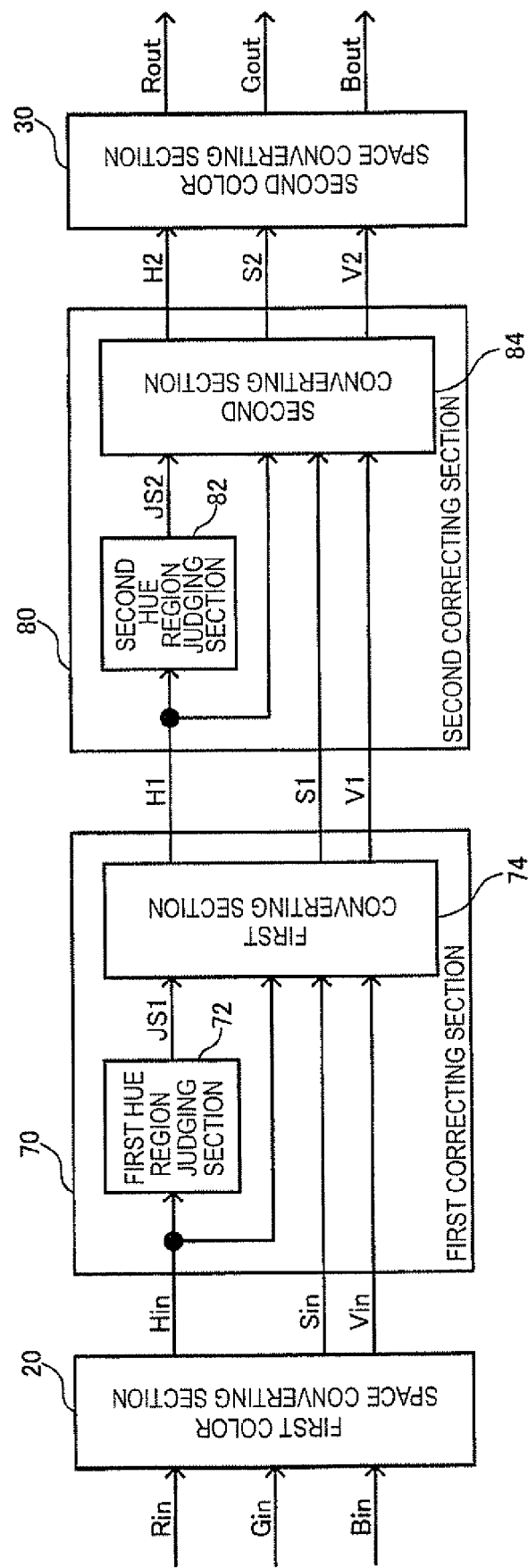
FIG. 6 is a diagram showing an image processor according to a modification of the embodiment.

FIG. 6 is a diagram showing an image processor according to a modification of the embodiment. The image processor of the modification cascadingly performs the image correction described by referring to FIG. 1 and the like and includes a first correcting section 70 and a second correcting section 80.

Specifically, the correcting section 70 provided at a first stage of a cascade connection corrects input HSV image data (Hin, Sin, and Vin) to output first post-correction HSV image data (H1, S1 and V1). Next, the correcting section 80 at a second stage of the cascade connection corrects the HSV image data (H1, S1 and V1) input from the first stage to output second post-correction HSV image data (H2, S2, and V2).

More specifically, the first correcting section 70 includes a first hue region judging section 72 and a first converting section 74. The first hue region judging section 72 judges whether the hue Hin (an input hue) is a value corresponding to the hue region or not to output a judgment signal JS1 (a first judgment signal). The converting section 74 corrects at least one component of the image data (Hin, Sin, and Vin).

For example, as the at least one component, the hue Hin is corrected. In this case, the converting section 74 receives the judgment signal JS1 to obtain a correction value ΔH1 (a first correction value). Then, the converting section 74 corrects the hue Hin by using the correction value ΔH1 to output a hue H1 (=Hin+ΔH1: a first post-correction hue). Alternatively, the correcting section 70 may correct the Sin (the input saturation) or the Vin (the input value). In addition, the correcting section 70 may correct at least one or all of the Hin, the Sin, and the Vin.

The second correcting section 80 includes a second hue region judging section 82 and a second converting section 84. The second region judging section 82 judges whether the hue H1 (the first post-correction hue) is a hue corresponding to the hue region or not to output a judgment signal JS2 (a second judgment signal). The converting section 84 corrects at least one component of the image data (H1, S1, and V1). For example, similarly to the converting section 74, the converting section 84 may correct the hue H1 as the at least one component of the image data.

Structures and operations of the correcting sections 70 and 80 are the same as those described in FIGS. 1 to 5 and the expressions (1) to (16) and thus will not be described below.

The image processor of the modification may include a first color space converting section 20 and a second color space converting section 30. The first and the second color space converting sections 20 and 30 convert an RGB color space to an HSV color space. Specifically, the color-space converting section 20 at a front stage converts input RGB image data (Rin, Gin, and Bin) input to the image processor of the modification to HSV image data (Hin, Sin, and Vin) corresponding to the input data. The color-space converting section 30 at a rear stage converts HSV image data (H2, S2 and V2) as corrected image data to output-RGB image data (Rout, Gout, and Bout) corresponding to the HSV image data.

Meanwhile, for the image processor having the structural example described by referring to FIG. 1 and the like, highly flexible image correction can be performed in the plurality of hue regions, but it may be difficult to correct overlapping hue regions.

On this point, in the image processor of the modification, the correcting sections are cascade-connected so as to facilitate correction of the overlapping hue regions. The correction will be described below by referring to FIGS. 7A and 7B.

Figure 7A:
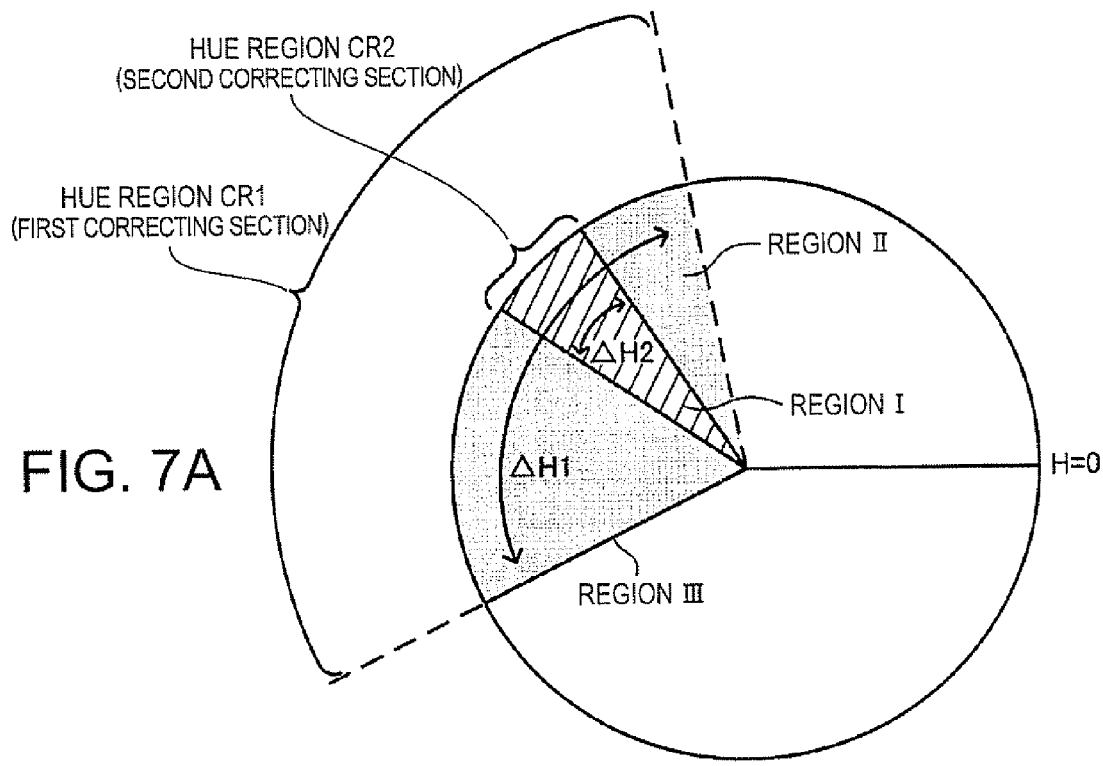
FIGS. 7A and 7B are illustrations showing examples of correction by the image processor of the modification.

For a comparison with the modification of FIG. 6, FIG. 7A shows correction by a single-stage correcting section. Using the single-stage correcting section is not enough to correct a plurality of hue regions overlapping each other. Accordingly, for example, as in FIG. 7A, overlapping hue regions CR1 and CR2 need to be divided into regions I to III. Then, a correction value ΔH1 may need to be set for the regions II and III, whereas a synthesized correction value of the correction value ΔH1 and a correction value ΔH2 may need to be set for the region I. Thus, using the single-stage correcting section increases the number of hue regions to be set and provides a complicated correction value.

In contrast, the image processor of the modification shown in FIG. 6 allows an overlapped hue region to be secondarily corrected. Specifically, for example, as shown in FIG. 7A, after correcting the hue region CR1 by using the correction value ΔH1, the overlapped hue region CR2 can be corrected by using the correction value ΔH2. Thus, unlike the structure using the single-stage correcting section, there is no need for setting a complicated correction value. For example, the image processor of the modification can intuitively set a correction value in order to finely adjust a part of a corrected wide range.

Figure 7B:
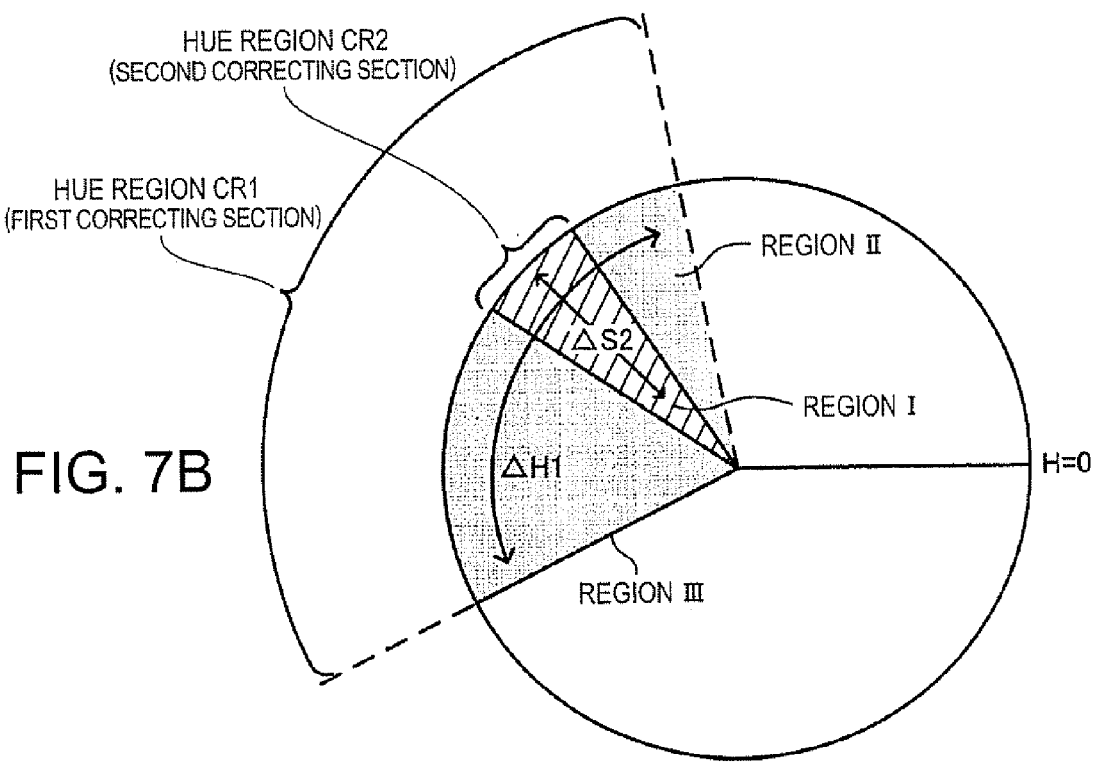

Furthermore, in the modification shown in FIG. 6, the correcting sections 70 and 80 can correct different components in the image data. For example, as shown in FIG. 7B, the hue region CR1 may be corrected by using the correction value ΔH1, and the hue region CR2 may be corrected by using the correction value ΔS2.

As described above, the correcting sections 70 and 80 have the same structure as that shown in FIG. 1 and thus the structure thereof is not described. Specifically, by replacement of terms as below, the description of the structural example in FIG. 1 and the like can also be applied to the correcting sections 70 and 80.

The correcting section 70 corresponds to the structural example of the image processor shown in FIG. 1 as follows. The hue region judging section 72 and the converting section 74, respectively, of the correcting section 70 correspond to the hue region judging section 50 and the converting section 60, respectively, in FIG. 1. The first judgment signal JS1 and the first correction value ΔH1, respectively, in the correcting section 70 correspond to the judgment signal JS and the correction value ΔH, respectively, in FIG. 1. The input HSV image data (Hin, Sin, and Vin) input to the correcting section 70 correspond to those input to the image processor of FIG. 1. The first post-correction HSV image data (H1, S1 and V1) output by the correcting section 70 correspond to the HSV image data (Hout, Sout, and Vout) output by the image processor of FIG. 1.

In addition, the correcting section 80 corresponds to the structural example of the image processor in FIG. 1 as follows. The hue region judging section 82 and the converting section 84, respectively, of the correcting section 80 correspond to the hue region judging section 50 and the converting section 60, respectively, in FIG. 1. The second judgment signal JS2 and the second correction value ΔH2, respectively, in the correcting section 80 correspond to the judgment signal JS and the correction value ΔH, respectively, in FIG. 1. The first post-correction HSV image data (H1, S2, and V2) input to the correcting section 80 correspond to the HSV image data (Hi, Sin, and Vin) input to the image processor of FIG. 1. The second post-correction HSV image data (H2, S2 and V2) output by the correcting section 80 correspond to the HSV image data (Hout, Sout, and Vout) output by the image processor of FIG. 1.

3. Detailed Structural Example

Figure 8:
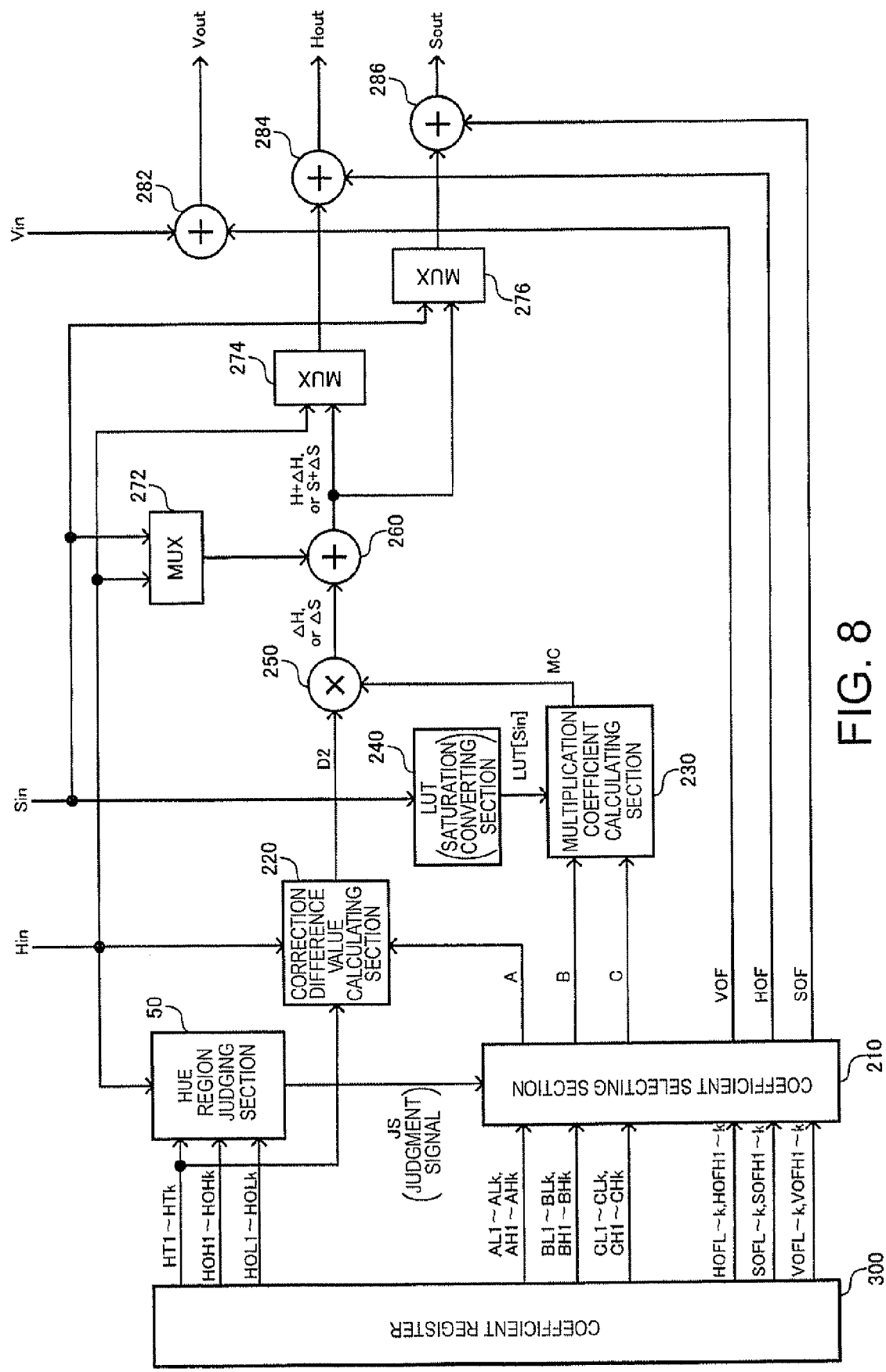
FIG. 8 is a diagram showing a specific structural example of the image processor of the embodiment.

FIG. 8 is a diagram showing a detailed structural example of the image processor of the embodiment. In the structural example of FIG. 8, the hue Hin or the saturation Sin is corrected by using the correction values obtained by each of the expressions (13) and (14) (the tenth specific example) in k pieces of hue regions (k is a natural number). In this example, a register value MOD is set to select a hue correction mode correcting the hue Hin or a saturation correction mode correcting the saturation Sin. In addition, the detailed structural example of FIG. 8 can also be applied to the correcting sections 70 and 80 shown in FIG. 6. Hereinbelow, constituent elements such as the hue region judging section and the like shown in FIG. 1 and the like will be denoted by the same reference numerals and descriptions thereof will not be given.

The structural example of FIG. 8 includes a coefficient register 300, the hue region judging section 50, a coefficient selecting section 210, a correction difference value calculating section 220, a LUT 240, a multiplication coefficient calculating section 230, a multiplying section 250, an adding section 260, multiplexers 272, 274, and 276, and offset adding sections 282, 284, and 286.

In the coefficient register 300, register values are set that include a correction reference target value, a low-hue region range, a high-hue region range, a correction reference difference value, a correction coefficient, a saturation coefficient, and offsets (such as HT1 to HTk), which are corresponding to each of the k pieces of hue regions. In addition, the coefficient register 300 also includes a mode MOD as a register value. For example, the register values may be set in the coefficient register 300 by using a host computer 106 shown in FIG. 9.

The coefficient selecting section 210 receives the judgment signal JS from the hue region judging section 50 to read out a resister value from the coefficient register 300. Specifically, among the register values from the coefficient register 300, the coefficient selecting section 210 selects register values corresponding to a hue region to which a hue Hin belongs, and then outputs as a correction reference target value HT, a correction reference difference value A, a coefficient B, a coefficient C, offsets HOF, SOF, and VOF. For example, when the hue Hin is in a high hue region of a hue region n (n is a natural number equal to or smaller than k), the coefficient selecting section 210 selects a register value AHn from register values AL1 to ALk and ΔH1 to ΔHk to output as the correction reference difference value A.

The correction difference value calculating section 220 receives, in addition to the hue Hin, the correction reference target value HT and the correction reference difference value A from the coefficient selecting section 210 to calculate and output a difference value D2 (=|A−|Hin−HT||).

The LUT 240 (a saturation converting section) converts the saturation Sin to a converted saturation LUT[Sin] based on a look-up table to output the LUT[Sin]. The converted saturation LUT[Sin] is a value uniquely determined based on the saturation Sin by using the look-up table. To perform conversion, the LUT 240 may use any other calculation technique (e.g. calculation by a multiplying unit or an adding unit), as an alternative to the look-up table.

The multiplication coefficient calculating section 230 receives the coefficients B, C and the converted saturation LUT[Sin] to output the multiplication coefficient MC. The multiplication coefficient calculating section 230 multiplies the coefficient B by the converted saturation LUT[Sin], and then, adds a result of the multiplication to the coefficient C to calculate a multiplication coefficient MC (=B*LUT[Sin]+C). The multiplication between the coefficient B and the LUT [Sin] and addition of the coefficient C to the multiplication result may include multiplication or addition of any other value.

The multiplying section 250 multiplies the difference value D2 from the correction difference value calculating section 220 by the multiplication coefficient MC from the multiplication coefficient calculating section 230 to output a correction value ΔH (or ΔS, excluding any offsets). The multiplication between the D2 and the MC may include multiplication or addition of any other value.

The multiplexer 272 receives the hue Hin and the saturation Sin. Then, the multiplexer 272 receives the register value MOD to output the hue Hin for a hue correction mode or output the saturation Sin for a saturation correction mode.

The adding section 260 adds the output of the multiplexer 272 to the correction value from the multiplying section 250 to output a hue (Hin+ΔH) or a saturation (Sin+ΔS).

The multiplexer 274 receives the hue Hin, the hue (Hin+ΔH) and the register value MOD, and the multiplexer 276 receives the saturation Sin, the saturation (Sin+ΔS) and the register value MOD. For the hue correction mode, the multiplexer 274 outputs the hue (Hin+ΔH) and the multiplexer 276 outputs the saturation Sin, whereas, for the saturation correction mode, the multiplexer 274 outputs the hue Hin and the multiplexer 276 outputs the saturation (Sin+ΔS).

The offset adding section 282 adds the value Vin to the offset VOF from the coefficient selecting section 210 to output a value Vout. In addition, the offset adding section 284 adds the output of the multiplexer 274 to the offset HOF from the coefficient selecting section 210 to output a hue Hout. The offset adding section 286 adds the output of the multiplexer 276 to the offset SOF from the coefficient selecting section 210 to output a saturation Hout.

However, the image processor of the embodiment is not restricted to the structural example of FIG. 8 and can be modified. For example, the value Vin as well as the hue Hin and the saturation Sin may be corrected by the correction value using the difference value D2, or the image processor may perform correction using the correction value described in any of the other specific examples above, instead of the tenth specific example.

4. Mobile Phone Terminal

Figure 9:
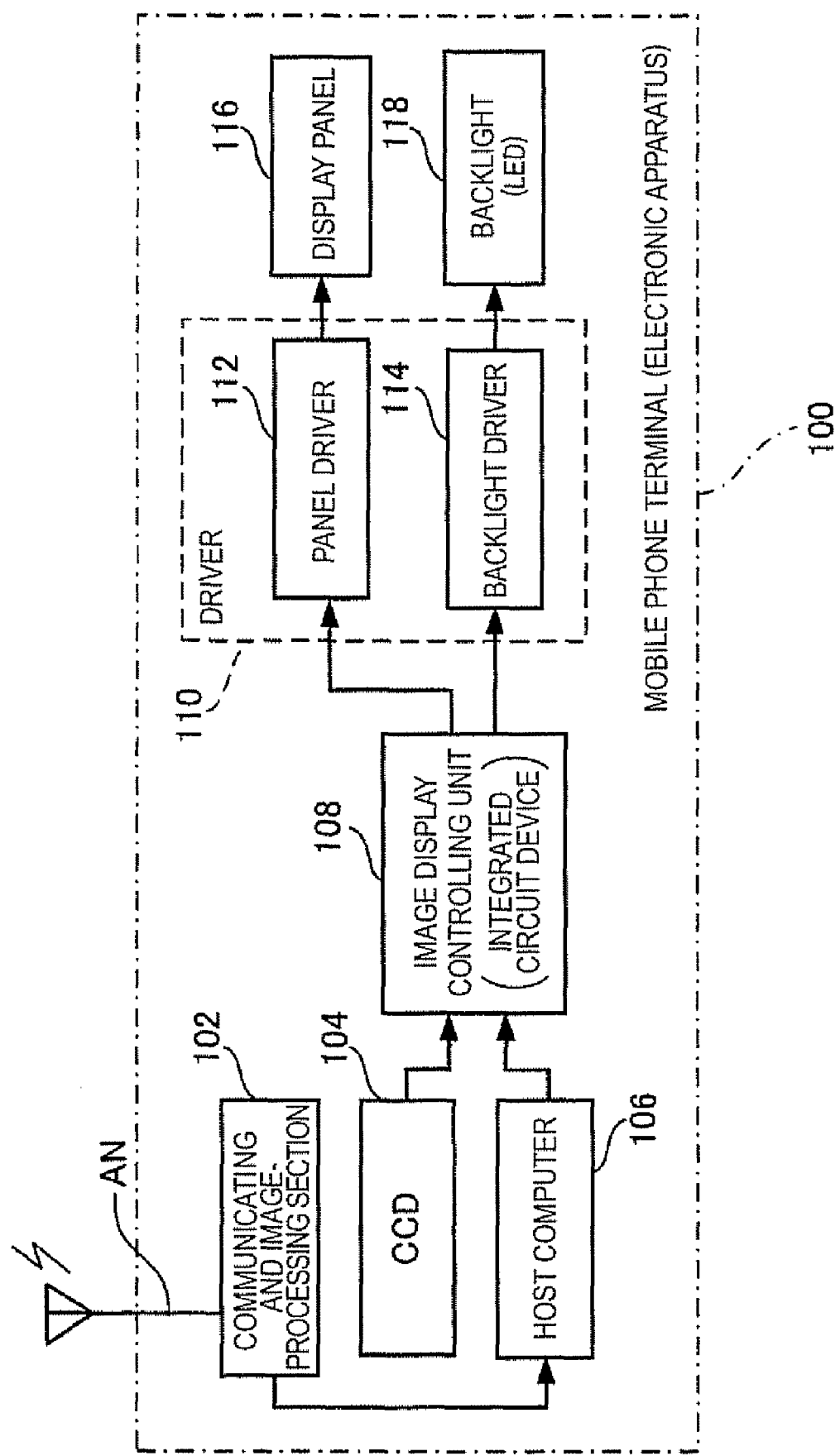
FIG. 9 is a diagram of a structural example of an electronic apparatus.

FIG. 9 is a diagram showing a structural example of a mobile phone terminal (an electronic apparatus). In FIG. 9, a mobile phone terminal 100 (the electronic apparatus) includes an image display controlling unit 108 (an integrated circuit device), in addition to an antenna AN, a communicating and image-processing section 102, a CCD camera 104, the host computer 106, a driver 110 (including a panel driver 112 and a backlight driver 114), a display panel (such as a liquid crystal panel (LCD)) 116 and a backlight (LED) 118.

The communicating and image-processing section 102 receives image data via the antenna AN. The host computer 106 outputs the image data received by the communicating and image-processing section 102 and a control signal to the image display controlling unit 108. The CCD camera 104 shoots an image and outputs image data to the image display controlling unit 108.

The image display controlling unit 108 includes the image processor of the embodiment to perform image processing (image correction) described by referring to FIG. 1 and the like for image data input from the host computer 106 and the CCD camera 104. Then, the image display controlling unit 108 outputs a control signal to the driver 110 based on the image data that were subjected to the image processing. In addition, the image display controlling unit 108 may also include a dimming section that adaptively dims backlight in accordance with a display image or may also include a brightness and saturation correcting section that adaptively corrects brightness and saturation in accordance with the display image and the backlight dimming. In this case, the image display controlling unit 108 outputs, to the panel driver 112, the image data that were subjected to the image processing by the image processor and the image processing by the brightness and saturation correcting section, and outputs, to the backlight driver 114, an amount of backlight dimming output by the dimming section.

The driver 110 drives the display panel 116 and the backlight 118. Specifically, the panel driver 112 receives the image data from the image display controlling unit 108 to drive the display panel 116. In addition, the backlight driver 114 receives the amount of backlight dimming from the image display controlling unit 108 to drive the backlight 118.

The image display controlling unit 108 may be an integrated circuit device provided separately from the driver 110 or may be incorporated in the driver 110. Alternatively, the image display controlling unit 108 may be incorporated in a controller of the driver 110 or in a driving and controlling unit (a driver and controller integrated unit).

While the embodiments have been described in detail as above, it should be obvious to those skilled in the art that many modifications can be made in the invention without departing substantially from new matters and advantageous effects of the invention. Thus, all of such modifications should be included in the scope of the invention. For example, in the specification or in the drawings, terms (such as difference value D1, difference value D2, coefficient C, coefficient B, and look-up table, LUT[Sin]) used at least once along with different terms having broader or similar meanings (such as first difference value, second difference value, correction coefficient, saturation coefficient, saturation converting section, and converted-saturation) can be replaced by the different terms in any part of the specification or the drawings. In addition, structures and operations of the hue region judging sections, the converting sections, the first and the second correcting sections, the first and the second color space converting sections, the coefficient register, the coefficient selecting section, the correction difference value calculating section, the saturation converting section, the multiplication coefficient calculating section, the integrated circuit device, the electronic apparatus, and the like are not restricted to those described above and can be modified in various manner.

What is claimed is:

1. An image processor, comprising:
    a hue region judging section judging which one of a plurality of hue regions corresponds to a hue; and
    a converting section obtaining a first difference value by using a difference between the hue and a first reference value, obtaining a second difference value by using a difference between a second reference value and the first difference value, and obtaining a correction value by using the second difference value to correct the hue.

2. The image processor according to claim 1, wherein the converting section obtains, as the first difference value, an absolute value of the difference between the hue and the first reference value and obtains the second difference value by using a difference between the second reference value and the first difference value to obtain the correction value by using the second difference value.

3. The image processor according to claim 2, wherein the converting section obtains the correction value by using, as the second difference value, an absolute value of the difference between the second reference value and the first difference value.

4. The image processor according to claim 1, wherein the converting section multiplies the second difference value by a correction coefficient to obtain the correction value.

5. The image processor according to claim 4 further including a coefficient register setting the first and the second reference values and the correction coefficient, wherein the converting section reads out the reference values and the correction coefficient from the coefficient register based on a judgment result from the hue region judging section.

6. The image processor according to claim 1, wherein the converting section obtains a multiplication coefficient by using a saturation and multiplies the second difference value by the multiplication coefficient to obtain the correction value.

7. The image processor according to claim 6, wherein the converting section multiplies the saturation by a saturation coefficient to obtain the multiplication coefficient and multiplies the second difference value by the multiplication coefficient to obtain the correction value.

8. The image processor according to claim 7, wherein the converting section adds a result of the multiplication between the saturation and the saturation coefficient to a correction coefficient to obtain the multiplication coefficient and multiplies the second difference value by the multiplication coefficient to obtain the correction value.

9. The image processor according to claim 8 further including a coefficient register setting the first and the second reference values, the correction coefficient and the saturation coefficient, wherein the converting section reads out the reference values and the coefficients from the coefficient register based on a judgment result from the hue region judging section.

10. The image processor according to claim 6, wherein the converting section includes a saturation converting section converting the saturation to output a converted saturation and obtains a multiplication coefficient by using the converted saturation to multiply the second difference value by the multiplication coefficient so as to obtain the correction value.

11. The image processor according to claim 10, wherein the saturation converting section converts the saturation based on a look-up table to output the converted saturation.

12. The image processor according to claim 10, wherein the converting section multiplies the converted saturation by a saturation coefficient to obtain the multiplication coefficient and multiplies the second difference value by the multiplication coefficient to obtain the correction value.

13. The image processor according to claim 12, wherein the converting section adds a result of the multiplication between the converted saturation and the saturation coefficient to a correction coefficient to obtain the multiplication coefficient and multiplies the second difference value by the multiplication coefficient to obtain the correction value.

14. An integrated circuit device including the image processor of claim 1.

15. An electronic apparatus including the integrated circuit device of claim 14.

16. An image processor, comprising:
    a hue region judging section judging which one of a plurality of hue regions corresponds to a hue; and
        a converting section obtaining a first difference value by using a difference between the hue and a first reference value, obtaining a second difference value by using a difference between a second reference value and the first difference value, and obtaining a correction value by using the second difference value to correct a saturation.

* * * * *